(12) United States Patent
Watanabe (10) Patent No.: US 11,687,397 B2
(45) Date of Patent: Jun. 27, 2023

(54) CONTROL DEVICE, METHOD, AND COMPUTER-READABLE STORAGE MEDIUM

(71) Applicant: Yokogawa Electric Corporation, Tokyo (JP)

(72) Inventor: Ikutomo Watanabe, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 0 days.

(21) Appl. No.: 17/452,399

(22) Filed: Oct. 26, 2021

(65) Prior Publication Data
US 2022/0138033 A1 May 5, 2022

(30) Foreign Application Priority Data
Oct. 30, 2020 (JP) ................................ 2020-183150

(51) Int. Cl.
G06F 11/00 (2006.01)
G06F 11/07 (2006.01)
G06F 13/40 (2006.01)

(52) U.S. Cl.
CPC ........ *G06F 11/079* (2013.01); *G06F 11/0706* (2013.01); *G06F 11/0751* (2013.01); *G06F 13/4022* (2013.01)

(58) Field of Classification Search
None
See application file for complete search history.

(56) References Cited

U.S. PATENT DOCUMENTS

| 2008/0313362 A1* | 12/2008 | Takamoto | ........... G06F 11/2038 |
| | | | 710/19 |
| 2015/0120004 A1 | 4/2015 | Jimi | |
| 2017/0155546 A1 | 6/2017 | Watanabe | |
| 2018/0224842 A1* | 8/2018 | Ichimura | ............ G05B 19/058 |

FOREIGN PATENT DOCUMENTS

| JP | 2006209486 A | 8/2006 |
| JP | 2012014353 A | 1/2012 |
| JP | 2015087833 A | 5/2015 |
| JP | 2016143283 A | 8/2016 |
| JP | 2017102569 A | 6/2017 |
| JP | 2018128820 A | 8/2018 |

OTHER PUBLICATIONS

Google Scholar/Patents search—text refined (Year: 2022).*
Google Scholar/Patents search—text refined (Year: 2023).*
Office Action issued for counterpart Japanese Application No. 2020-183150, issued by the Japanese Patent Office dated Feb. 14, 2023 (drafted on Feb. 8, 2023).

* cited by examiner

*Primary Examiner* — Christopher S Mccarthy (57) ABSTRACT

There is provided a device including: a diagnosis unit configured to diagnose an input and output function, in an input and output device that is configured to perform an input and output operation in accordance with the input and output function programmed in programmable circuitry; an error detection unit configured to detect an error of a configuration storage area; and an abnormality determination unit configured not to determine an abnormality of the input and output device when the error of the configuration storage area is detected and the input and output function is diagnosed to be normal.

19 Claims, 6 Drawing Sheets

CONTROL DEVICE, METHOD, AND COMPUTER-READABLE STORAGE MEDIUM

CROSS REFERENCE TO RELATED APPLICATION

The contents of the following Japanese patent application(s) are incorporated herein by reference:
NO. 2020-183150 filed in JP on Oct. 30, 2020

BACKGROUND

1. Technical Field

The present invention relates to a device, a method, and a computer-readable storage medium.

2. Related Art

Patent Document 1 discloses that "with the control device, the abnormality determination unit can determine whether the location of the soft error corresponds to an unused portion or a used portion of the functional unit, and thus it is possible to prevent unnecessary stop while realizing high reliability" (paragraph 0017).

PRIOR ART DOCUMENT

Patent Document

[Patent Document 1] Japanese Patent Application Publication No. 2018-128820

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
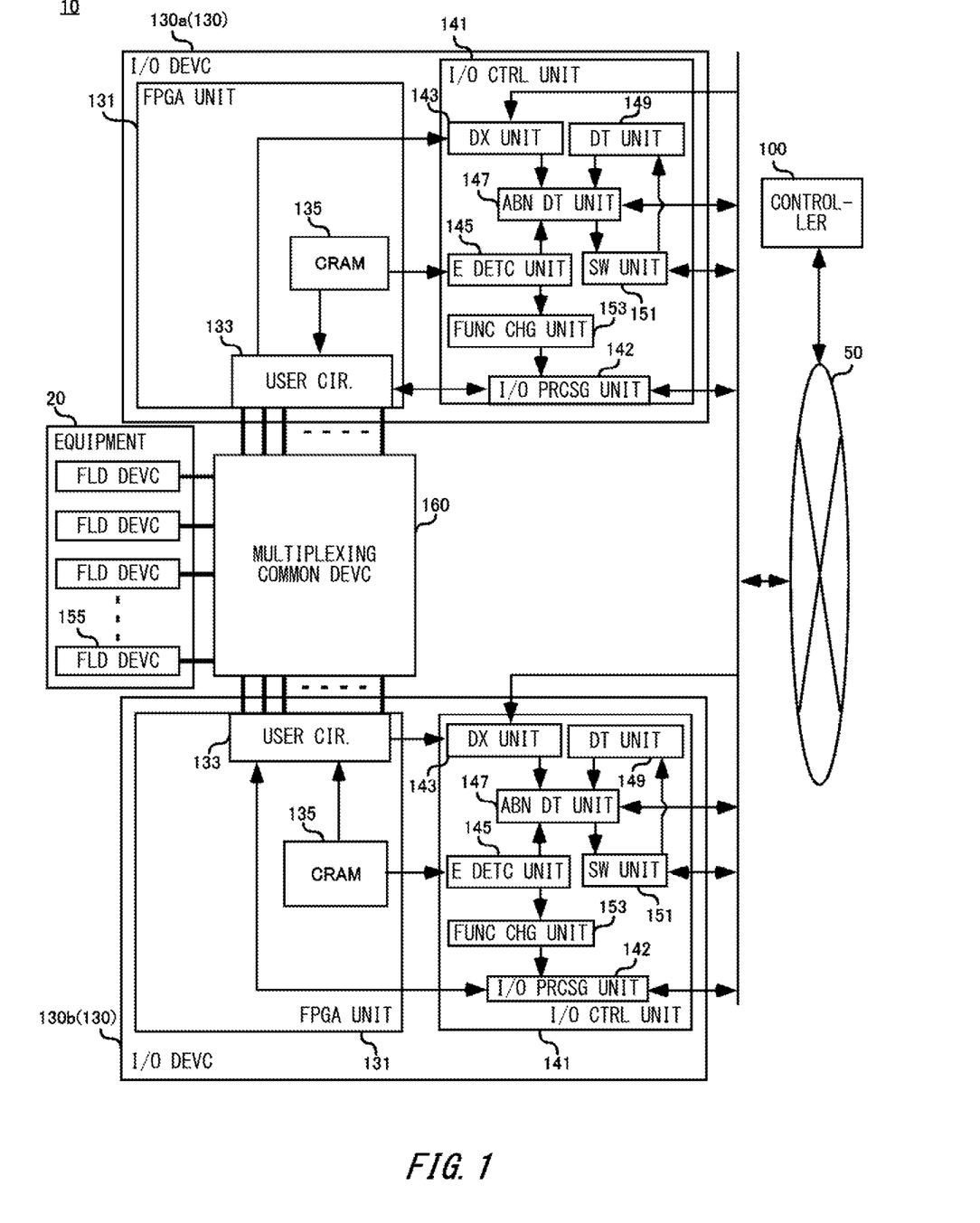
FIG. 1 shows a configuration of a control system 10 according to the present embodiment together with equipment 20.

FIG. 1 shows a configuration of a control system 10 according to the present embodiment together with equipment 20. The control system 10 according to the present embodiment controls one or more field devices 155 in the equipment 20.

The equipment 20 is provided in a factory, a plant, or the like. For example, such a factory or plant may be: a factory for producing various industrial products and the like; an industrial plant relating to chemistry, metal, or the like; a plant for managing and controlling wellheads in a gas field, an oil field, and the like, and their surroundings; a plant for managing and controlling power generation of hydroelectric power, thermal power, nuclear power, and the like; a plant for managing and controlling energy harvesting from solar power, wind power, and the like; a plant for managing and controlling water and sewerage, dams, and the like; and the like. In addition, the equipment 20 may be provided in a building, transportation, or the like.

The control system 10 controls each field device 155 in the equipment 20 to perform production, power generation, and/or control in accordance with the purpose of the equipment 20. For example, the field device 155 may be: a sensor device such as a pressure gauge, a flow meter, and a temperature sensor; a valve device such as a flow control valve, and an opening and closing valve; an actuator device such as a fan and a motor; an image capturing device such as a camera or a video recorder that captures an image of a situation and a target object in the plant; an acoustic device such as a microphone or a speaker that collects an abnormal noise or the like in the plant or emits a warning sound or the like; a location detection device that outputs location information of each device in the equipment 20; and another such device.

The control system 10 according to the present embodiment includes a network 50, a controller 100, a multiplexing common device 160, and one or more input and output devices 130 capable of having a redundant configuration. As an example, the control system 10 of the present embodiment includes two input and output devices 130a, 130b. The two input and output devices 130a, 130b have functions and configurations similar to each other, and the same reference number is used for the same configuration, and a duplicate description is omitted. In addition, in the following description, the two input and output devices 130a, 130b may be simply referred to as an input and output device 130. In a case of referring to the input and output device 130, the case may refer to both of the two input and output devices 130a, 130b, or may refer to any one of them. Note that an input and output indicates at least one of an input or an output, and an input device and an output device are also included in the input and output device.

The network 50 is a general-purpose or dedicated network that connects the controller 100 and the input and output device 130 to each other. The network 50 may be Ethernet (registered trademark), may be a LAN which is used in the premises of the plant or the like, or may be a bus. In addition, when the controller 100 remotely controls the equipment 20, the network 50 may be a wide area network such as a WAN or the Internet. The network 50 may be a wired network including the wired Internet or the like, or instead of this, may be a wireless network including a mobile communication network or the like, for example, such as 4G (a 4th generation) or 5G (a 5th generation). The network 50 may be configured to include an industrial network. The network 50 may realize a communication between the controller 100 and the input and output device 130 by transmitting a network packet.

The controller 100 receives sense data or the like of each field device 155, from the input and output device 130 that is connected to each field device 155 in the equipment 20 via the multiplexing common device 160. The controller 100 controls a calculation process based on control parameters such as the sense data, and transmits control data for controlling each field device 155 to the input and output device 130.

In the present embodiment, the controller 100 may be a computer such as a PC (a personal computer), a workstation, a server computer, or a general-purpose computer, which functions as the controller 100 by executing a control program on the computer. Instead of this, the controller 100 may be a dedicated computer designed for controlling the plant or the like, or may be dedicated hardware realized by dedicated circuitry.

The multiplexing common device 160 transmits a signal between each field device 155 and the input and output device 130 in charge of controlling the equipment 20 in the plurality of input and output devices 130 having the redundant configuration. The multiplexing common device 160 is connected to each input and output port of the two input and output devices 130. The multiplexing common device 160 is also connected to the one or more field devices 155 in the equipment 20. Note that via the multiplexing common device 160, the plurality of field devices 155 and the input and output device 130 may be capable of an intercommunication by using a communication protocol defined by HART (registered trademark), BRAIN, Foundation Fieldbus (registered trademark), ISA100.11a, or the like.

The input and output device 130 has programmable circuitry of which a circuit configuration is programmed by setting configuration data, and performs an input and output operation in accordance with an input and output function programmed in the programmable circuitry. The input and output device 130 according to the present embodiment may be referred to as a network I/O or a universal I/O. Note that the input and output device 130 may be a dedicated device that is designed for controlling the plant or the like and that has a microcontroller or the like, may be a device obtained by adding, to a general computer, a user circuit for connecting to the multiplexing common device 160, or may be dedicated hardware realized by dedicated circuitry.

The input and output device 130 according to the present embodiment includes an FPGA (a Field Programmable Gate Array) unit 131 as an example of the programmable circuitry, and an input and output control unit 141. The FPGA unit 131 includes a user circuit 133 realized by programming the programmable circuitry, and a CRAM (Configuration Random Access Memory) 135 that is an example of a configuration storage area for storing the above-described configuration data.

The user circuit 133 of the FPGA unit 131 has a plurality of input and output ports, for example, 16 input and output ports that are individually connected to the multiplexing common device 160. For channels respectively connected to the field devices 155 via the multiplexing common device 160, the user circuit 133 includes various interface circuits for the channels, for example, such as an input buffer and an output driver for inputting and outputting a digital signal, an AD converter and a DA converter for inputting and outputting an analog signal, a memory that stores a reference value for an AD conversion or a DA conversion, or the like. In the input and output device 130, such an interface circuit may be provided in a configuration other than the FPGA unit 131.

The user circuit 133 transmits and receives the analog signal or the digital signal to and from each field device 155 according to the function of each field device 155. For example, when a channel connected to the field device 155 is set for outputting or inputting the analog signal, the user circuit 133 converts the digital signal output from the input and output device 130 into the analog signal by the DA converter, and converts the analog signal from the field device 155 into the digital signal by the AD converter.

One input and output port of the input and output device 130a and one input and output port of the input and output device 130b are assigned to one field device 155. Between the input and output device 130a and the input and output device 130b, the input and output device 130 that serves as a main system (also referred to as a "control system" or a "master") has the input and output port which is connected, by the multiplexing common device 160, to the field device 155 to enable the communication with the field device 155. Between the input and output device 130a and the input and output device 130b, the input and output device 130 that serves as an auxiliary system (also referred to as a "standby system" or a "slave") has the input and output port on which the communication with the field device 155 is disabled by the multiplexing common device 160 not to interfere with the communication between the input and output devices 130 that serves as the main system, and the field devices 155.

For each of the plurality of input and output ports, the user circuit 133 further has an input and output circuit that switches the input and output function of the multiplexing common device 160 with respect to the field device 155, to at least one of AI (analog input), AO (analog output), DI (digital input), or DO (digital output). In such an input and output circuit, each input and output port may be set to any input and output function such that other input and output functions are not set to be used.

In an initialization process at a time of power supply, reset, or the like, the FPGA unit 131 reads the configuration data which is copied from a ROM outside the FPGA unit 131 and stored in the CRAM 135, and sets the user circuit 133 to the programmable circuitry in the FPGA unit 131. The user circuit 133 receives the control data for controlling each field device 155 from the input and output control unit 141, and performs the input and output operation in accordance with the programmed input and output function.

The user circuit 133 sets a predetermined input and output port to a predetermined input and output function according to the above-described input and output function, and outputs, from the input and output port to the multiplexing common device 160, data that is for the field device 155 and that has a signal format in accordance with the above-described input and output function. In addition, the user circuit 133 outputs the sense data or the like to the input and output control unit 141, when the sense data or the like of the field device 155 is input from the multiplexing common device 160 in the signal format in accordance with the above-described input and output function via the input and output port.

In this way, the input and output device 130 inputs and outputs the data to and from the one or more field devices 155 in the above-mentioned equipment 20 based on the control data received from the controller 100 in cooperation with the CRAM 135 and the user circuit 133 of the FPGA unit 131, and the input and output control unit 141. In addition to the process, the input and output device 130 performs a self-diagnosis on an abnormality of the input and output device 130.

The input and output control unit 141 has an input and output processing unit 142 that receives, from the controller 100 via the network 50, the control data for operating the input and output device 130, the multiplexing common device 160, and the one or more field devices 155, and processes the control data. The input and output control unit 141 further has a diagnosis unit 143, an error detection unit 145, and an abnormality determination unit 147. The input and output control unit 141 according to the present embodiment further has a determination unit 149, a switch unit 151, and a function change unit 153.

The diagnosis unit 143 diagnoses the programmed input and output function of the input and output device 130. As a specific example, the diagnosis unit 143 diagnoses the input and output function of the user circuit 133 by externally controlling a self-diagnosis circuit programmed in the user circuit 133 of the FPGA unit 131. The diagnosis unit 143 may also loop back the signal, which is output by the user circuit 133 to the field device 155 via the multiplexing common device 160, to the user circuit 133 from the multiplexing common device 160, or the like, thereby diagnosing the input and output function of the multiplexing common device 160. The diagnosis unit 143 diagnoses each input and output function at a timing, for example, during the initialization process of the input and output device 130, for each predetermined maintenance period, or the like. The diagnosis unit 143 outputs a diagnosis result to the abnormality determination unit 147.

The error detection unit 145 detects an error of the configuration storage area in which the configuration data is stored. Specifically, the error detection unit 145 detects a soft error of the CRAM 135 of the FPGA unit 131 by using a CRC (Cyclic Redundancy Check) code. The error detection unit 145 checks the soft error of the CRAM 135 at a timing, for example, during the initialization process of the input and output device 130, for each predetermined maintenance period, or the like. Note that when the FPGA unit 131 has a function of self-diagnosing a storage area of the CRAM 135, the error detection unit 145 may receive, from the CRAM 135, a self-diagnosis result of the storage area. The error detection unit 145 outputs a detection result to the abnormality determination unit 147.

As an example, the error detection unit 145 may detect the soft error by using the CRC code added for each frame of the CRAM 135, and performing the CRC check on a frame basis. For a plurality of frames included in the CRAM 135, the error detection unit 145 may perform, in order, calculations of CRC codes, and CRC checks whether the added CRC codes are consistent, to cyclically perform the CRC checks again from the first frame when the CRC checks of all the frames are completed.

Note that the soft error detected by the error detection unit 145 is, for example, a failure temporarily occurring, not a permanent failure that has occurred in the hardware. The soft error may be a temporary 1 bit failure (1 bit garbled) of the memory. Note that the CRAM 135 may not have an error correction function by an ECC (Error Correction Code, an error correction code).

The determination unit 149 determines whether the input and output device 130 is multiplexed. More specifically, from the switch unit 151 that mutually communicates information with the switch unit 151 of another input and output device 130 having the redundant configuration, the determination unit 149 acquires the information and determines whether the input and output device 130 is multiplexed based on the information. The determination unit 149 outputs, to the abnormality determination unit 147, a determination result regarding whether the input and output device 130 is multiplexed.

The abnormality determination unit 147 determines the abnormality of the input and output device 130 based on data input from the diagnosis unit 143, the error detection unit 145, and the determination unit 149. Note that the abnormality determination unit 147 does not determine the abnormality of the input and output device 130 for at least some portion, when the error of the CRAM 135 is detected and the programmed input and output function of the user circuit 133 is diagnosed to be normal. When determining the abnormality of the input and output device 130, the abnormality determination unit 147 transmits the detection result to the controller 100 via the bus and the network 50.

The switch unit 151 switches the input and output device 130 which operates as the main system in the plurality of multiplexed input and output devices 130 in response to the abnormality of the input and output device 130, which operates as the main system, being detected. The switch unit 151 performs the intercommunication with the switch unit 151 of the other input and output device 130 via the bus. When switching the input and output device 130 which operates as the main system, the switch unit 151 may transmit, to the multiplexing common device 160 via a bus, a switching signal for adjusting a connection state between each field device 155, and the user circuit 133 of each input and output device 130.

The function change unit 153 controls a change of the input and output function of the user circuit 133 according to an error state of the CRAM 135 of the FPGA unit 131. For example, the function change unit 153 may prohibit the change of the input and output function of the user circuit 133 in response to the error of the CRAM 135 being detected. More specifically, the function change unit 153 outputs, to the input and output processing unit 142, an instruction to prohibit the change of the input and output function of the user circuit 133 in response to acquiring, from the error detection unit 145, the result of detecting the error of the CRAM 135.

Note that the input and output control unit 141 may include a program that controls the input and output device 130, a ROM (Read Only Memory) that stores data or the like required for an operation of the program, a RAM (Random Access Memory) that operates as a work area of the input and output device 130, or the like. In this case, for example, in the initialization process at a time of power supply, reset, or the like for the input and output device 130, the function change unit 153 may read the configuration data from the ROM and write the read configuration data to the CRAM 135 of the FPGA unit 131, thereby performing initial setting of the CRAM 135.

Figure 2:
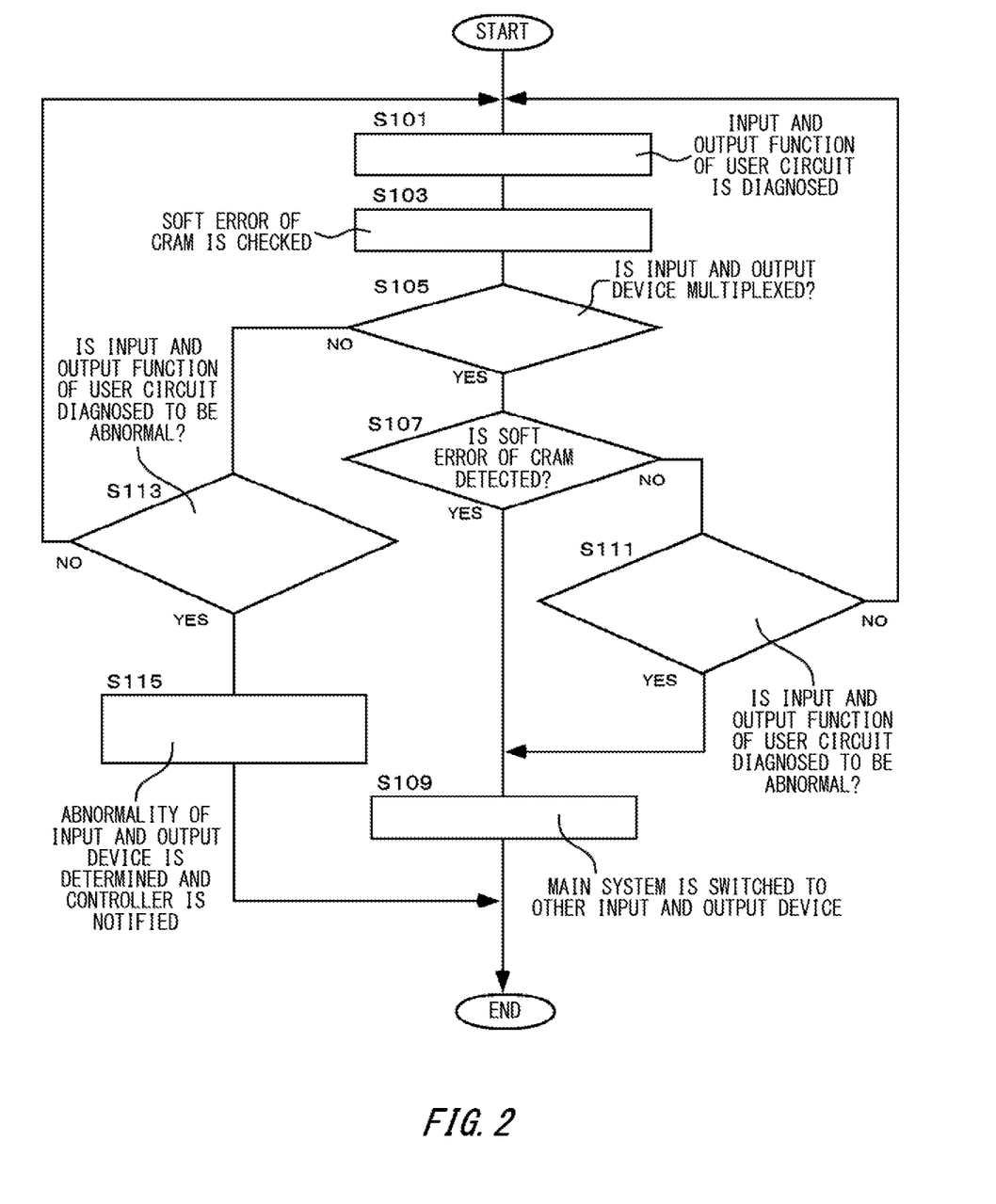
FIG. 2 shows an example of an operation flow of an input and output device 130 according to the present embodiment.

FIG. 2 shows an example of an operation flow of an input and output device 130 according to the present embodiment. By using the operation flow, processing when the input and output device 130 according to the present embodiment detects the soft error, and/or diagnoses that the input and output function is abnormal will be described.

The operation flow may be started, for example, by the user circuit 133 receiving the control data for controlling each field device 155 from the input and output processing unit 142, and performing the input and output operation in accordance with the programmed input and output function. Flowcharts after FIG. 3, the descriptions are similar, and a duplicate description will be omitted.

The diagnosis unit 143 of the input and output device 130*a* diagnoses the input and output function of the user circuit 133 for each predetermined maintenance period (step S101), and the error detection unit 145 checks the soft error of the CRAM 135 for each predetermined maintenance period (step S103).

The abnormality determination unit 147 of the input and output device 130*a* according to the present embodiment determines the abnormality of the input and output device 130*a* which operates as the main system, on condition that the error of the CRAM 135 in the input and output device 130*a*, which operates as the main system, is detected when the input and output device 130 is multiplexed and the input and output function of the user circuit 133 in the input and output device 130*a*, which operates as the main system, is diagnosed to be normal.

More specifically, the abnormality determination unit 147 of the input and output device 130*a* acquires, from the determination unit 149, the determination result regarding whether the input and output device 130 is multiplexed (step S105), and if the determination result is that input and output device 130 is multiplexed (step S105: YES), on condition that the soft error of the CRAM 135 is detected in step S103 (step S107: YES), the abnormality determination unit 147 determines the abnormality of the input and output device 130*a* which operates as the main system, and switches the main system to the other input and output device 130*b* (step S109), and this flow ends. In addition, even if in step S107, the soft error of the CRAM 135 is not detected in step S103 (step S107: NO), in a case where the input and output function of the user circuit 133 is diagnosed to be abnormal in step S101 (step S111: YES), the abnormality determination unit 147 determines the abnormality of the input and output device 130*a* which operates as the main system, and switches the main system to the other input and output device 130*b* (step S109), and this flow ends. Note that in step S111, if the input and output function of the user circuit 133 is not diagnosed to be abnormal in step S101 (step S111: NO), processing returns to step S101.

In this way, if the processing proceeds to step S109 with step S105 and step S107 being YES, that is, if the input and output device 130 is multiplexed and the soft error of the CRAM 135 is detected, the diagnosis result of the input and output function in step S101 is not taken into consideration. In other words, when the input and output device 130 is multiplexed and the soft error of the CRAM 135 in the input and output device 130*a*, which operates as the main system, is detected, for example, even in a case where the input and output function of the user circuit 133 is diagnosed to be normal, the abnormality of the input and output device 130*a* is determined. This makes it possible for the input and output device 130 to maintain an operating rate (availability) and suppress a rate of an undetected failure as much as possible.

Note that for example, assuming that the input and output device 130*a* operates as the main system between the two input and output devices 130*a*, 130*b* with the redundant configuration, the case where the input and output devices 130 is determined to be multiplexed may refer to a state in which the input and output functions of the other input and output device 130*b* and the multiplexing common device 160 are diagnosed to be normal. On the other hand, for example, assuming that the input and output device 130*a* operates as the main system between the two input and output devices 130*a*, 130*b* with the redundant configuration, a case where the input and output devices 130 is not determined to be multiplexed may refer to a state in which the input and output function of at least one of the other input and output device 130*b* and the multiplexing common device 160 is diagnosed to be abnormal.

In addition, the abnormality determination unit 147 of the input and output device 130*a* according to the present embodiment does not determine the abnormality of the input and output device 130*a*, on condition that the input and output device 130*a* is not multiplexed when the error of the CRAM 135 is detected and the input and output function of the user circuit 133 is diagnosed to be normal.

More specifically, the abnormality determination unit 147 of the input and output device 130*a* acquires, from the determination unit 149, the determination result regarding whether the input and output device 130 is multiplexed (step S105), and if the determination result is that input and output device 130 is not multiplexed (step S105: NO), in a case where the input and output function of the user circuit 133 is not diagnosed to be abnormal in step S101 (step S113: NO), the processing returns to step S101. Note that when the soft error of the CRAM 135 is detected in step S103, the function change unit 153 may output, to the input and output processing unit 142, the instruction to prohibit the change of the input and output function of the user circuit 133. In this case, the input and output processing unit 142 may change the above-mentioned control data which is output to the user circuit 133, and notify the controller 100 to that effect. In step S113, if the input and output function of the user circuit 133 is diagnosed to be abnormal in step S101 (step S113: YES), the abnormality of the input and output device 130*a* is determined, and the controller 100 is notified (step S115) to that effect, and this flow ends.

In this way, if the processing returns to step S101 with step S105 and step S113 being NO, that is, if the input and output device 130 is not multiplexed and the input and output function of the user circuit 133 is not diagnosed to be abnormal, the check result of the soft error of the CRAM 135 in step S103 is not taken into consideration. In other words, when the input and output device 130 is not multiplexed and the input and output function of the user circuit 133 in the input and output device 130*a*, which operates as the main system, is not diagnosed to be abnormal, for example, even in a case where the soft error of the CRAM 135 is detected, the abnormality of the input and output device 130*a* is not determined. The CRC check by the error detection unit 145 detects the soft error as a soft error of the entire CRAM 135 even when the error partially occurs in areas of the CRAM 135, and thus the abnormality determination unit 147 is set to ignore an error in an area of the CRAM 135 which is not related to the input and output function of the user circuit 133.

As a comparative example, when the input and output device detects a failure by depending only on the CRC check of the CRAM, a failure rate unnecessarily increases and the operating rate is reduced. In contrast, with the above-described configuration of the input and output device 130, it is possible to suppress such a reduction in operating rate.

Figure 3:
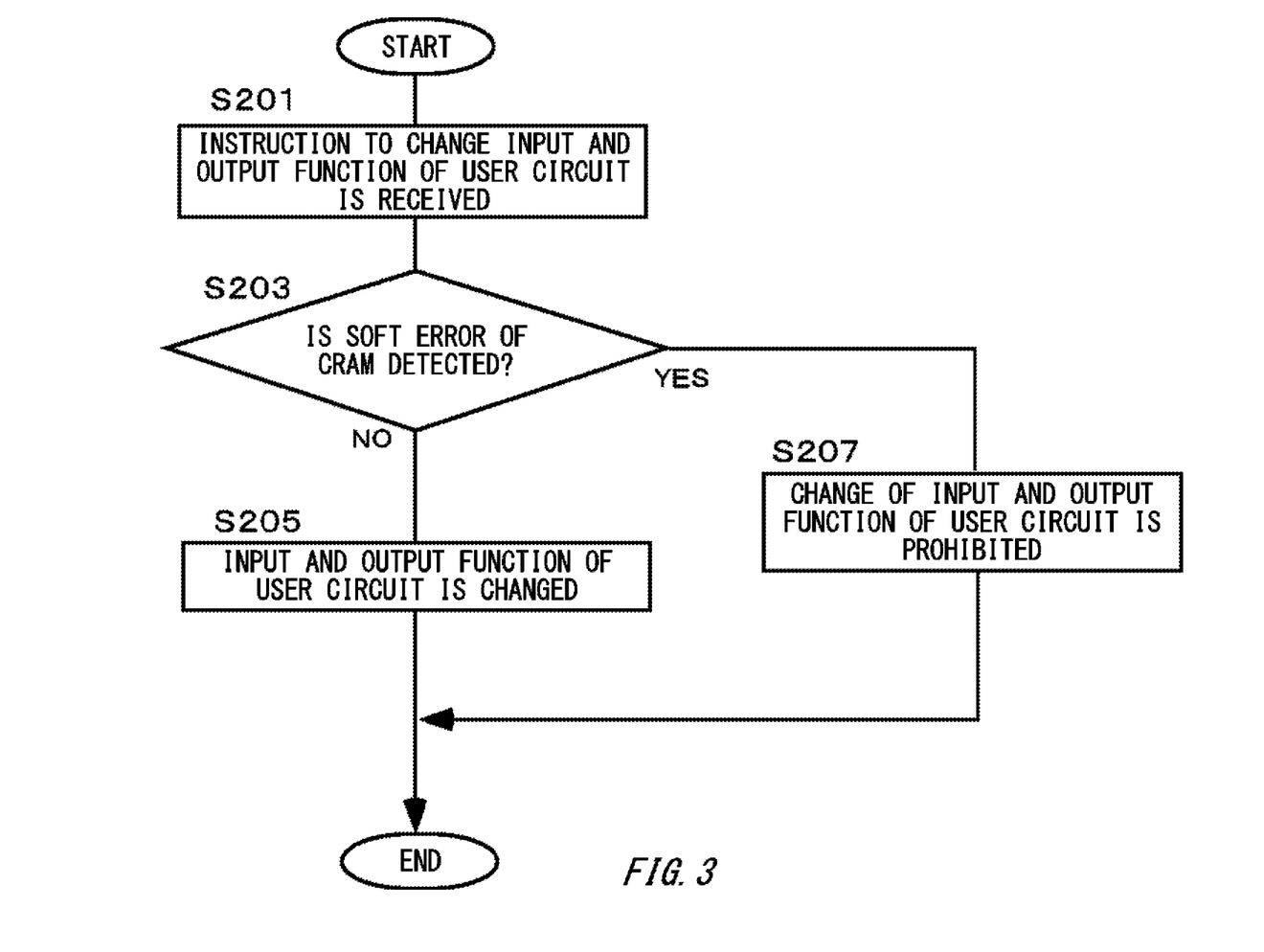
FIG. 3 shows an example of an operation flow when an input and output processing unit 142 of the input and output device 130 according to the present embodiment receives, from a controller 100, an instruction to change an input and output function of a user circuit 133.

FIG. 3 shows an example of an operation flow when an input and output processing unit 142 of the input and output device 130 according to the present embodiment receives, from a controller 100, an instruction to change an input and output function of a user circuit 133. Note that the input and output function required by the input and output device 130 is predetermined according to a specification of the field device 155 that is a connection destination.

The input and output processing unit 142 of the input and output device 130 receives, from the controller 100, the control data for changing the input and output function of the user circuit 133 (step S201). If the function change unit 153 does not acquire, from the error detection unit 145, the detection result that the soft error of the CRAM 135 is detected, and does not output the instruction to the input and output processing unit 142 (step S203: NO), the input and output processing unit 142 changes the input and output function of the user circuit 133 (step S205), and this flow ends.

On the other hand, in step S203, if the function change unit 153 acquires, from the error detection unit 145, the detection result that the soft error of the CRAM 135 is detected, and outputs, to the input and output processing unit 142, the instruction to prohibit the change of the input and output function of the user circuit 133 (step S203: YES), the input and output processing unit 142 prohibits the change of the input and output function of the user circuit 133 (step S207), and notifies the controller 100 to that effect, and this flow ends. The controller 100 has to change the input and output function of a predetermined channel (the input and output port) of the input and output device 130, for example, because the field device 155 is changed, the setting of the field device 155 is changed, or the like. However, in a case where the soft error of the CRAM 135 is detected and there is a possibility that the input and output device 130 does not correctly operate when the input and output function is changed, the input and output device 130 may not change the input and output function as shown in the operation flow of FIG. 3.

Figure 4:
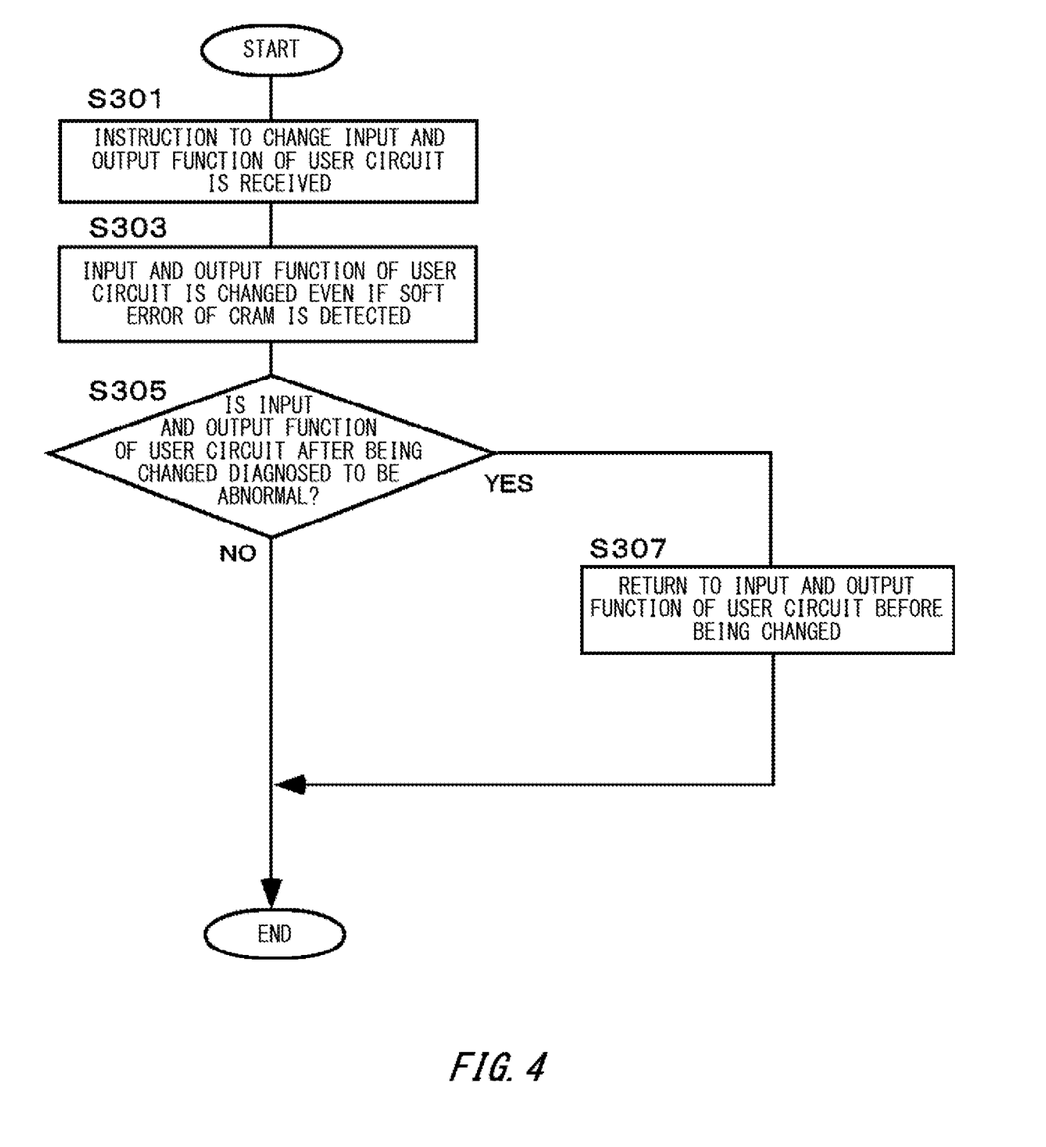
FIG. 4 shows another example of the operation flow when the input and output processing unit 142 of the input and output device 130 according to the present embodiment receives, from the controller 100, the instruction to change the input and output function of the user circuit 133.

FIG. 4 shows another example of the operation flow when the input and output processing unit 142 of the input and output device 130 according to the present embodiment receives, from the controller 100, the instruction to change the input and output function of the user circuit 133.

The input and output processing unit 142 of the input and output device 130 receives, from the controller 100, the control data for changing the input and output function of the user circuit 133 (step S301). The input and output processing unit 142 changes the input and output function of the user circuit 133 even if the function change unit 153 acquires, from the error detection unit 145, the detection result that the soft error of the CRAM 135 is detected (step S303).

The function change unit 153 may return the input and output function of the user circuit 133 to the input and output function before being changed, when the soft error of the CRAM 135 is detected, and the input and output function of the user circuit 133 after being changed by the function change unit 153 is diagnosed to be abnormal. More specifically, if the input and output function of the user circuit 133 is changed in step S303, and then the function change unit 153 acquires, from the diagnosis unit 143, the diagnosis result that the input and output function of the user circuit 133 is abnormal (step S305: YES), the input and output processing unit 142 receives, from the function change unit 153, an instruction to return the input and output function of the user circuit 133 to the input and output function before being changed, returns the input and output function to the input and output function before being changed in step S303 according to this instruction (step S307), and notifies the controller 100 to that effect, and this flow ends. In step S305, it may not matter whether the function change unit 153 acquires, from the error detection unit 145, the detection result that the soft error of the CRAM 135 is detected. Note that if in step S305, the function change unit 153 does not acquire, from the diagnosis unit 143, the diagnosis result that the input and output function of the user circuit 133 is abnormal (step S305: NO), this flow ends. In this way, even when the soft error of the CRAM 135 is detected before the input and output function of the user circuit 133 is changed, there is a possibility that the soft error has occurred in an area of the CRAM 135 which does not affect the input and output function of the user circuit 133 after being changed, and thus the input and output device 130 may verify whether the input and output function of the user circuit 133 is affected after the input and output function is changed, as shown in the operation flow of FIG. 4.

Figure 5:
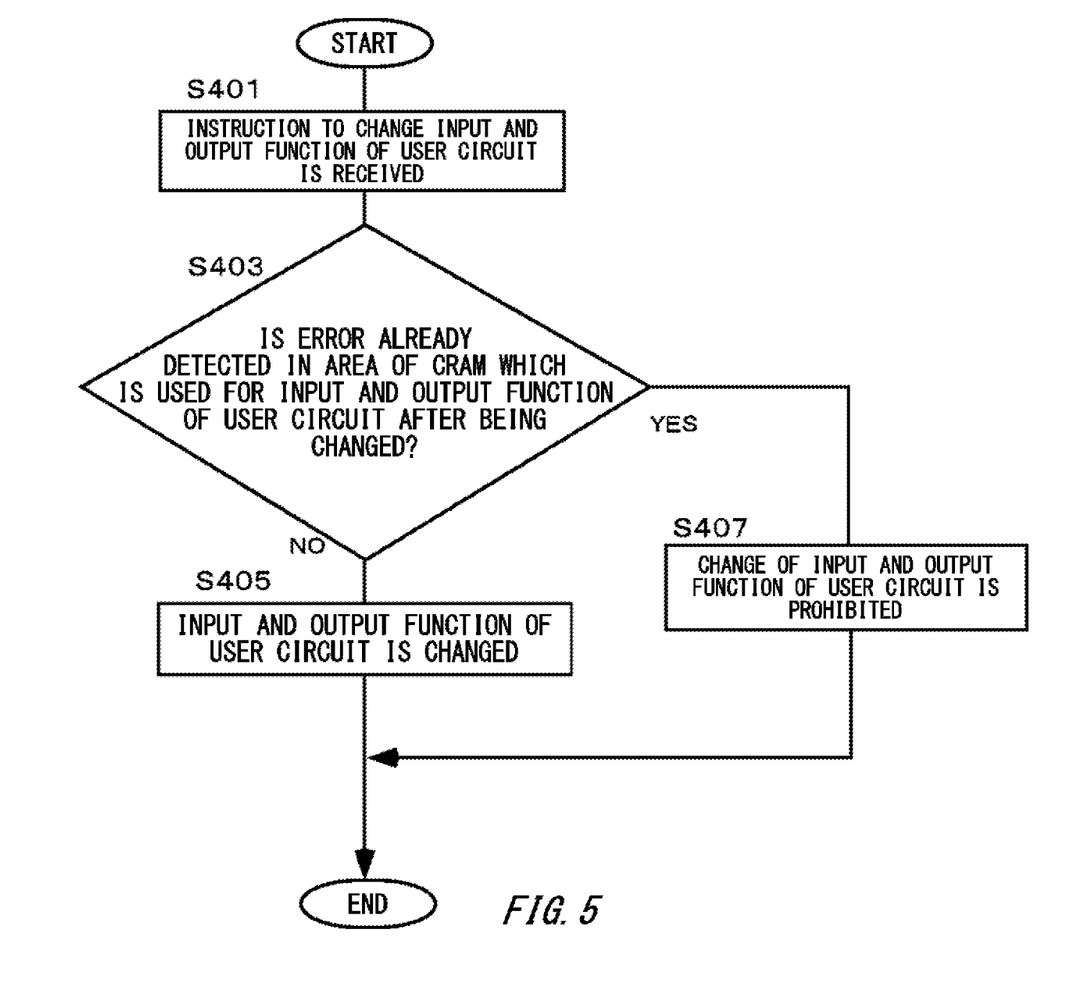
FIG. 5 shows still another example of the operation flow when the input and output processing unit 142 of the input and output device 130 according to the present embodiment receives, from the controller 100, the instruction to change the input and output function of the user circuit 133.

FIG. 5 shows still another example of the operation flow when the input and output processing unit 142 of the input and output device 130 according to the present embodiment receives, from the controller 100, the instruction to change the input and output function of the user circuit 133. The input and output device 130 according to the present embodiment is different from the plurality of embodiments described with reference to FIG. 1 to FIG. 4 at least in that the error detection unit 145 detects the error in each of a plurality of partial areas into which the CRAM 135 is divided.

The input and output processing unit 142 of the input and output device 130 receives, from the controller 100, the control data for changing the input and output function of the user circuit 133 (step S401).

The function change unit 153 may prohibit the change of the input and output function of the user circuit 133, on condition that the error is already detected in the partial area of the CRAM 135 which is used for the input and output function of the user circuit 133 in a case where the input and output function of the user circuit 133 is changed. More specifically, if the function change unit 153 acquires, from the error detection unit 145, the detection result that the soft error of the partial area is detected, and outputs, to the input and output processing unit 142, the instruction to prohibit the change of the input and output function of the user circuit 133 (step S403: YES), the input and output processing unit 142 prohibits the change of the input and output function of the user circuit 133 (step S407), and notifies the controller 100 to that effect, and this flow ends. Note that if the function change unit 153 does not acquire the above-described detection result in step S403 (step S403: NO), the input and output processing unit 142 changes the input and output function of the user circuit 133 (step S405), and this flow ends. In this way, when the CRAM 135 in the input and output device 130 can be divided into the plurality of partial areas, for example, such as an analog area, a digital area, an input area, and an output area, and the soft error of each partial area can be detected, the input and output device 130 may verify, in advance before changing the input and output function of the user circuit 133, whether the input and output function of the user circuit 133 is affected after the input and output function is changed, as shown in the operation flow of FIG. 5.

As described above, the input and output device 130 according to the present embodiment has the programmable circuitry of which the circuit configuration is programmed by setting the configuration data, and performs the input and output operation in accordance with the input and output function programmed in the programmable circuitry. Then, the input and output device 130 according to the present embodiment includes: the diagnosis unit 143 that diagnoses the input and output function programmed in the programmable circuitry of the input and output device 130; the error detection unit 145 that detects the error of the configuration storage area in which the configuration data is stored; and the abnormality determination unit 147 that does not determine the abnormality of the input and output device 130 for at least some portion, when the error of the configuration storage area is detected and the programmed input and output function is diagnosed to be normal.

As a comparative example, in a single operation in which the input and output device is not multiplexed, when the abnormality is detected in the input and output device because the soft error of the CRAM is detected, and the operation of the input and output device is stopped, the availability of the input and output device is reduced. In contrast, with the input and output device 130 having the above-described configuration, even in a case where the soft error of the CRAM 135 is detected during the single operation, when the input and output function of the user circuit 133 can be diagnosed to be normal, the abnormality of the input and output device 130 is not determined. This makes it possible for the input and output device 130 according to the present embodiment to prevent the availability of the input and output device 130 from being reduced unlike the comparative example. On the other hand, in a case where the input and output device 130 has a multiplex system, even when the soft error of the CRAM 135 is detected, it is possible to switch to another system (the input and output device 130), and to maintain the availability.

Various embodiments of the present invention may be described with reference to flowcharts and block diagrams whose blocks may represent (1) steps of processes in which operations are executed or (2) sections of apparatuses responsible for executing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored in the tangible device comprises an article of manufacture including instructions which can be executed to create means for executing operations specified in the flowcharts or block diagrams. Examples of the computer-readable medium may include an electronic storage medium, a magnetic storage medium, an optical storage medium, an electromagnetic storage medium, a semiconductor storage medium, etc. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a programmable data processing apparatus such as a general-purpose computer, special purpose computer, or another computer, or to programmable circuitry, locally or via a local area network (LAN), wide area network (WAN) such as the Internet, etc., so that the computer-readable instructions are executed to create means for executing operations specified in the flowcharts or block diagrams. Examples of the processor include a computer processor, a processing unit, a microprocessor, a digital signal processor, a controller, a microcontroller, and the like.

Figure 6:
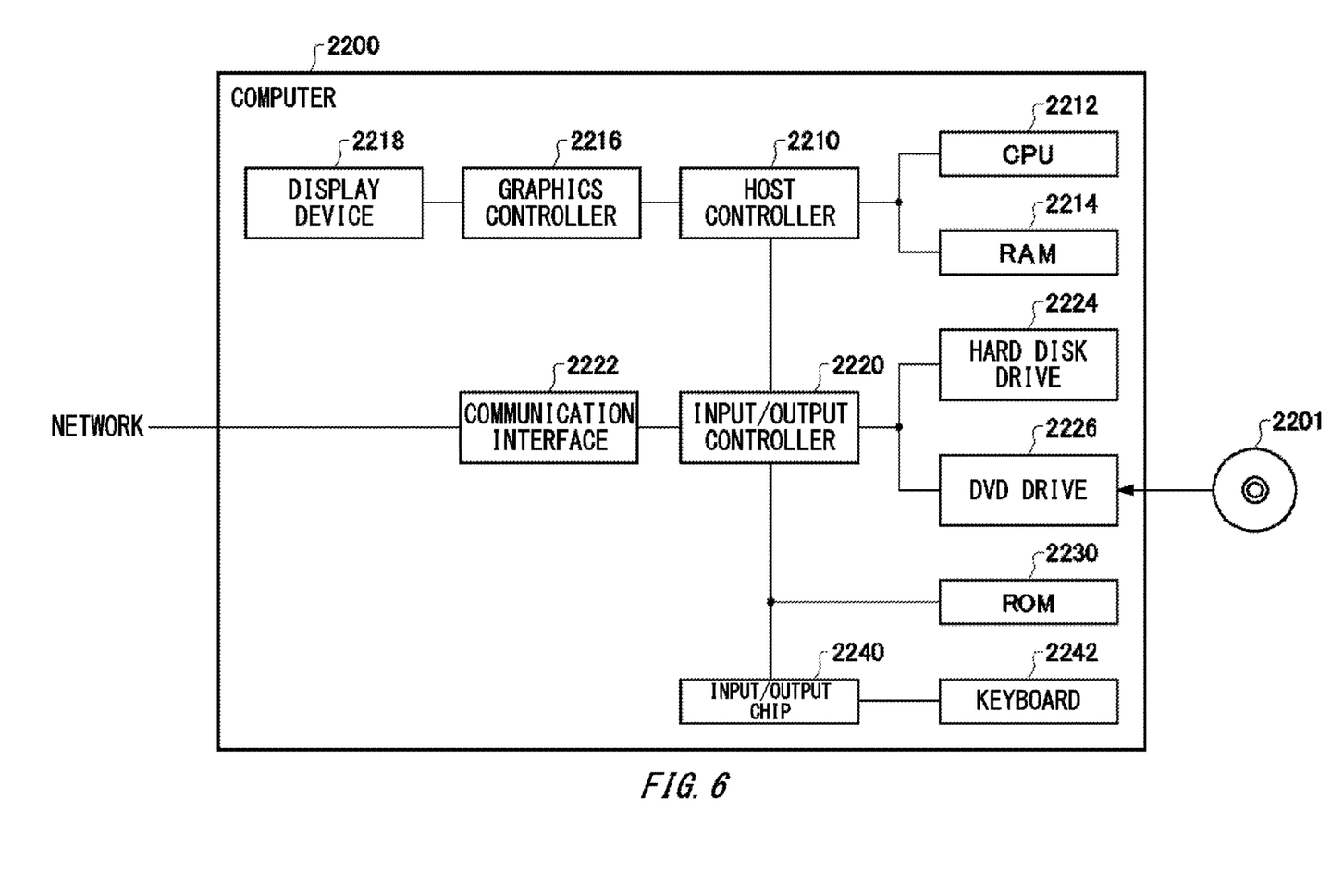
FIG. 6 shows an example of a computer 2200 in which a plurality of aspects of the present invention may be embodied entirely or partially.

FIG. 6 shows an example of a computer 2200 in which a plurality of aspects of the present invention may be embodied entirely or partially. A program that is installed in the computer 2200 can cause the computer 2200 to function as operations associated with apparatuses according to the embodiments of the present invention or one or more sections of the apparatuses, or can cause the computer 2200 to execute the operations or the one or more sections thereof, and/or can cause the computer 2200 to execute processes according to the embodiments of the present invention or steps of the processes. Such a program may be executed by a CPU 2212 to cause the computer 2200 to execute certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads the program and data from an IC card, and/or writes the program and data to the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, and the like.

A program is provided by the computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. The information processing written in these programs is read into the computer 2200, resulting in cooperation between a program and the above-mentioned various types of hardware resources. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card, etc., and execute various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute various types of processing on the data read from the RAM 2214 to write back a result to the RAM 2214, the processing being described throughout the present disclosure, specified by instruction sequences of the programs, and including various types of operations, information processing, condition determinations, conditional branching, unconditional branching, information retrievals/replacements, or the like. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-described program or software modules may be stored in the computer-readable media on the computer 2200 or near the computer 2200. In addition, a recording medium such as a hard disk or a RAM provided in a server system connected to a dedicated communication network or the Internet can be used as a computer-readable medium, thereby providing the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, the control system may be a computer housed in a single enclosure. That is, the controller may be realized by executing the program on the processor of the computer, and each input and output device may be implemented as an input/output device of the computer. In addition, the controller may also be implemented as a virtual machine executed by one or more processors. In such a configuration, the control system does not have a network that is a general-purpose or dedicated network, and the controller and the input and output device can be connected by a chipset, such as a memory controller hub and an input/output controller hub, which connects the processor and the input/output device to each other.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 control system, 20 equipment, 50 network, 100 controller, 130, 130a, 130b input and output device, 131 FPGA unit, 133 user circuit, 135 CRAM, 141 input and output control unit, 142 input and output processing unit, 143 diagnosis unit, 145 error detection unit, 147 abnormality determination unit, 149 determination unit, 151 switch unit, 153 function change unit, 155 field device, 160 multiplexing common device, 2200 computer, 2201 DVD-ROM, 2210 host controller, 2212 CPU, 2214 RAM, 2216 graphics controller, 2218 display device, 2220 input/output controller, 2222 communication interface, 2224 hard disk drive, 2226 DVD-ROM drive, 2230 ROM, 2240 input/output chip, 2242 keyboard

What is claimed is:

1. A device comprising:
a diagnosis unit configured to diagnose a programmed input and output function, in an input and output device that has programmable circuitry of which a circuit configuration is programmed by setting configuration data and that is configured to perform an input and output operation in accordance with the input and output function programmed in the programmable circuitry;
an error detection unit configured to detect an error of a configuration storage area in which the configuration data is stored;
a determination unit configured to determine whether the input and output device is multiplexed, and
an abnormality determination unit configured not to determine an abnormality of the input and output device, on condition that the input and output device is not multiplexed when the error of the configuration storage area is detected and the programmed input and output function is diagnosed to be normal.

2. The device according to claim 1, wherein
the abnormality determination unit is configured to determine the abnormality of the input and output device which operates as a main system, on condition that the error of the configuration storage area in the input and output device, which operates as the main system, is detected when the input and output device is multiplexed and the programmed input and output function of the input and output device, which operates as the main system, is diagnosed to be normal.

3. The device according to claim 2, further comprising:
a switch unit configured to switch an input and output device which operates as a main system in a plurality of multiplexed input and output devices, in response to the abnormality of the input and output device, which operates as the main system, being detected.

4. The device according to claim 3, further comprising:
a function change unit configured to control a change of the input and output function of the programmable circuitry according to an error state of the configuration storage area.

5. The device according to claim 4, wherein
the function change unit is configured to prohibit the change of the input and output function of the programmable circuitry in response to the error of the configuration storage area being detected.

6. The device according to claim 4, wherein
the function change unit is configured to return the input and output function of the programmable circuitry to the input and output function before being changed, when the error of the configuration storage area is detected, and the input and output function after being changed by the function change unit is diagnosed to be abnormal.

7. The device according to claim 2, further comprising:
a function change unit configured to control a change of the input and output function of the programmable circuitry according to an error state of the configuration storage area.

8. The device according to claim 7, wherein
the function change unit is configured to prohibit the change of the input and output function of the programmable circuitry in response to the error of the configuration storage area being detected.

9. The device according to claim 7, wherein
the function change unit is configured to return the input and output function of the programmable circuitry to the input and output function before being changed, when the error of the configuration storage area is detected, and the input and output function after being changed by the function change unit is diagnosed to be abnormal.

10. The device according to claim 1, further comprising:
a function change unit configured to control a change of the input and output function of the programmable circuitry according to an error state of the configuration storage area.

11. The device according to claim 10, wherein
the function change unit is configured to prohibit the change of the input and output function of the programmable circuitry in response to the error of the configuration storage area being detected.

12. The device according to claim 10, wherein
the function change unit is configured to return the input and output function of the programmable circuitry to the input and output function before being changed, when the error of the configuration storage area is detected, and the input and output function after being changed by the function change unit is diagnosed to be abnormal.

13. The device according to claim 10, wherein
the error detection unit is configured to detect an error in each of a plurality of partial areas into which the configuration storage area is divided, and the function change unit is configured to prohibit the change of the input and output function of the programmable circuitry, on condition that an error is already detected in the partial area which is used for the input and output function in a case where the input and output function of the programmable circuitry is changed.

14. The device according to claim 1, further comprising:
a function change unit configured to control a change of the input and output function of the programmable circuitry according to an error state of the configuration storage area.

15. The device according to claim 14, wherein
the function change unit is configured to prohibit the change of the input and output function of the programmable circuitry in response to the error of the configuration storage area being detected.

16. The device according to claim 14, wherein
the function change unit is configured to return the input and output function of the programmable circuitry to the input and output function before being changed, when the error of the configuration storage area is detected, and the input and output function after being changed by the function change unit is diagnosed to be abnormal.

17. The device according to claim 14, wherein
the error detection unit is configured to detect the error in each of a plurality of partial areas into which the configuration storage area is divided, and
the function change unit is configured to prohibit the change of the input and output function of the programmable circuitry, on condition that the error is already detected in the partial area which is used for the input and output function in a case where the input and output function of the programmable circuitry is changed.

18. A method comprising:
diagnosing a programmed input and output function, in an input and output device that has programmable circuitry of which a circuit configuration is programmed by setting configuration data and that is configured to perform an input and output operation in accordance with the input and output function programmed in the programmable circuitry;
detecting an error of a configuration storage area in which the configuration data is stored;
determining whether the input and output device is multiplexed; and
not determining an abnormality of the input and output-device on condition that the input and output device is not multiplexed when the error of the configuration storage area is detected and the programmed input and output function is diagnosed to be normal.

19. A non-transitory computer-readable storage medium having stored thereon a program that causes a computer to execute:
diagnosing a programmed input and output function, in an input and output device that has programmable circuitry of which a circuit configuration is programmed by setting configuration data and that is configured to perform an input and output operation in accordance with the input and output function programmed in the programmable circuitry;
detecting an error of a configuration storage area in which the configuration data is stored;
determining whether the input and output device is multiplexed; and not determining an abnormality of the input and output-device, on condition that the input and output device is not multiplexed when the error of the configuration storage area is detected and the programmed input and output function is diagnosed to be normal.

* * * * *